United States Patent Office 3,462,454
Patented Aug. 19, 1969

3,462,454
PREPARATION OF 3,3-BIS-(CHLORO-
METHYL)-OXETANE
Jurgen Gartner, Dusseldorf, Germany, assignor to
Henkel & Cie G.m.b.H., Dusseldorf, Germany, a
corporation of Germany
No Drawing. Filed Oct. 18, 1966, Ser. No. 587,411
Claims priority, application Germany, July 9, 1966,
H 59,909, H 59,911
Int. Cl. C07d 5/32
U.S. Cl. 260—333                              8 Claims

ABSTRACT OF THE DISCLOSURE

An improved process for the prepartion of 3,3-bis-(chloromethyl)-oxetane from the cyclic sulfurous acid ester of pentaerythritol dichlorohydrin in the presence of an acid scavenger.

PRIOR ART

In copending, commonly-assigned U.S. patent application Ser. No. 587,431 filed on even date herewith, there is described a novel process for the preparation of 3,3-bis-(chloromethyl)-oxetane by heating the cyclic sulfurous acid ester of pentaerythritol dichlorohydrin at elevated temperatures in the presence of a salt-like catalyst selected from the group consisting of organic onium compounds of elements of groups Va and VIa of the periodic table or organic compounds of the said elements which can be converted into onium compounds.

OBJECTS OF THE INVENTION

It is an object of the invention to provide an improved process for the preparation of 3,3-bis-(chloromethyl)-oxetane from the cyclic sulfurous acid ester of pentaerythritol dichlorohydrin with a novel catalyst.

It is another object of the invention to provide an improved process of the invention for the preparation of 3,3-bis-(chloromethyl)-oxetane in the presence of an acid scavenger.

This and other objects and advantages of the invention will become obvious from the following detailed description.

THE INVENTION

The novel process of the invention for the preparation of 3,3-bis-(chloromethyl)-oxetane comprises subjecting the cyclic sulfurous acid ester of pentaerythritol dichlorohydrin to thermolysis at temperatures from 200 to 450° C., preferably 240 to 330° C., in the presence of a salt-like catalyst selected from the group consisting of organic onium compounds of elements of groups Va and VIa of the periodic table and organic compounds which are converted into the said onium compounds and in the presence of an inorganic acid scavenger to form 3,3-bis-(chloromethyl)-oxetane and recovering the latter.

The use of the inorganic acid scavenger in the process has the advantages of increasing the yield of 3,3-bis-(chloromethyl)-oxetane based on the onium compound and increasing the rate of the thermolysis. Also, decomposition reactions which lead to deposits of char-like impurities in the columns are absent and the final product is of higher purity than in the said copending application.

The inorganic acid scavengers are used in their anhydrous state and the amount used is between 5 to 100 gm., preferably 10 to 50 gm., per mol of the said cyclic sulfurous acid ester. Of course, the acid scavengers should be stable under the reaction conditions.

Examples of suitable inorganic acid scavengers are oxides of metals of groups II and III of the periodic table such as aluminum oxide, magnesium oxide, etc.; alkaline reacting salts of alkali metals such as sodium pyrosulfite, sodium carbonate, trisodium phosphate, tripotassium phosphate, sodium silicate, sodium formate, sodium aluminate, etc., or mixtures thereof. Particularly favorable results are obtained with alkali metal aluminates.

Examples of salt-like onium compounds of elements of groups Va and VIa of the periodic table are onium compounds of phosphorus, nitrogen, arsenic and sulfur and compounds which are converted into onium compounds under the reaction conditions. The organic radicals may be alkyl, aryl, aralkyl or of heterocyclic niture.

Examples of suitable salt-like organic phosphonium compounds useful in the process of the invention are compounds of the formula

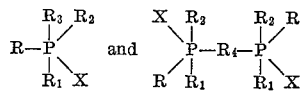

wherein R, R₁, R₂ and R₃ are selected from the group of alkyl of 1 to 22 carbon atoms and aryl and aralkyl radicals of 6 to 24 carbon atoms, R₄ is selected from the group of alkylene of 1 to 8 carbon atoms and arylene of 6 to 24 carbon atoms and X is an anion of a mineral or organic acid. Also useful are phosphines of the formula

wherein R, R₁ and R₂ have the above definitions.

Examples of specific organic phosphorous compounds are tetraphenylphosphonium chloride, tetraphenylphosphonium bromide, triphenylmethylphosphonium iodide, tetrabutylphosphonium chloride, tribenzylethylphosphonium chloride, dibenzyldiethylphosphonium chloride, benzyl-p.-toluylidimethylphosphonium chloride, triphenylbenzylphosphonium chloride, 1,4-butane-bis-(triethylphosphonium acetate) and triethyloctadecylphosphonium iodide. Examples of suitable phosphine compounds which may be used are triphenylphosphine, tributylphosphine, triisopropylphosphine, dimethylphenylphosphine, diethylphenylphosphine, ethylidiphenylphosphine, diethyl-o-toluylenephosphine, di-p.-toluylene chlorophosphine, and diphenylphosphine. Since the tertiary phosphorus compounds probably change into phosphonium compounds in the reaction mixture, this change is a probable explanation for their activity in the process of the invention.

Examples of suitable organic nitrogen compounds of the invention are quaternary ammonium compounds of the formula

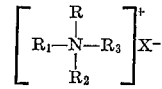

wherein R, R₁, R₂, R₃ and X have the above definitions and R and R₁ together with the nitrogen atom may form a heterocyclic.

Examples of specific nitrogen compounds are tetramethylammonium chloride, tetramethylammonium bromide, tetramethylammonium iodide, tetrabutylammonium chloride, trimethylbenzylammonium chloride, octadecylpyridinium chloride, pyridine, 2-methylpyridine, 2-ethylpyridine, quinoline, isoquinoline and acridine.

Particularly preferred catalysts are mixtures of phosphines and small amounts, i.e. up to 2%, of pyridine bases such as triphenylphosphine and pyridine and triphenylphosphine and quinoline.

The sulfonium compounds useful in the process of the invention are compounds of the formula

wherein R, $R_1$, $R_2$ and X have the above definitions. Examples of specific sulfonium compounds are triphenylsulfonium chloride, dimethyl-n-dodecylsulfoxoniummethylsulfate, trimethylsulfonium iodide, triethylsulfoniummethylsulfate, dimethyl-p-toluyl-sulfoniummethylsulfate, 2-oxyphenyldimethylsulfonium chloride, etc.

The arsonium compounds useful in the process are compounds of the formula

wherein R, $R_1$, $R_2$, $R_3$ and X have the above definitions. Examples of specific arsonium compounds are tetraphenylarsonium chloride, methyltriphenylarsonium iodide, triphenylbenzylarsonium chloride, etc.

The amount of the catalyst used depends on the activity of the particular catalyst, but generally about 0.2–0.002 mol-percent, preferably 0.15 to 0.01 mole-percent, based on 1 mol of the cyclic sulfurous acid ester of pentaerythritol dichlorohydrin, will suffice. The reaction temperature varies between about 200° and 450° C., preferably between 240° and 330° C. At these temperatures, reaction times from about ½ hour to 8 hours, usually between 2 and 5 hours, are sufficient. To accomplish the reaction, the cyclic sulfurous acid ester of pentaerythritol dichlorohydrin is admixed with the catalyst, and the reaction mixture is heated to the said temperatures. High-boiling organic solvents may be used to dilute the reaction mixture.

Preferably, 3,3-bis-(chloromethyl)-oxetane, which has a lower boiling point than the cyclic sulfurous acid ester of pentaerythritol dichlorohydrin, is continuously distilled from the reaction mixture which avoids any further reaction of the said oxetane. Advantageously, the admixture of the cyclic sulfurous acid ester of pentaerythritol dichlorohydrin and the organic onium compound is added to the reaction mixture in the same proportion as 3,3-bis-(chloromethyl)-oxetane is distilled off, which gives an exceptional continuous operation. The distillation of the said oxetane formed is preferably carried out at reduced pressure, such as between 500 to 700 torr and about normal atmospheric pressure, in a distillation column.

The 3,3-bis-(chloromethyl)-oxetane, precipitating during the thermolysis, is already present in relatively pure form and by means of simple distillation, it can be further purified and subsequently polymerized. As known in the art, 3,3-bis-(chloromethyl)-oxetane can be converted by means of a ring opening polymerization into polymers having valuable properties.

The cyclic sulfurous acid ester of pentaerythritol dichlorohydrin starting material can be prepared in known ways such as described in German Patents No. 875,805 and No. 871,449.

Another feature of the process of the invention for the preparation of 3,3-bis-(chloromethyl)-oxetane comprises subjecting the cyclic sulfurous acid ester of pentaerythritol dichlorohydrin to thermolysis at temperatures from 200 to 450° C., preferably 240° to 330° C., in the presence of a tris-(p-dialkylaminophenyl)-phosphine in which the alkyl has 1 to 8 carbon atoms, preferably 1 to 4 carbon atoms to form 3,3-bis-(chloromethyl)-oxetane and recovering the latter. A preferred phosphine is tris-(p-dimethylaminophenyl)-phosphine and it is also advantageous to use small amounts of pyridine bases with the said phosphines.

The use of tris-(p-dialkylaminophenyl)-phosphines has the unexpected advantages over the phosphines described in said copending application Ser. No. 587,431 of higher yields of 3,3-bis-(chloromethyl)-oxetane based on the amount of phosphine used, increased rate of thermolysis and reduced amounts of decomposition side products.

In the following examples there are described several preferred embodiments to illustrate the invention. However, it should be understood that the invention is not intended to be limited to the specific embodiments.

Example I

A three-neck, round bottom flask of ½ liter capacity was equipped with a dropping funnel, a stopper and an inlet tube for nitrogen and a 1 meter column having an inside diameter of 2.5 cm. and filled with Raschig rings of 4 x 4 mm. The column was connected with a receiver by means of a head with adjustable reflux. The reaction was initiated by adding 80 gm. of dry, finely powdered sodium aluminate and after having heated the vessel to 300° C. by means of a metal bath, 50 ml. of a mixture of 1752 gm. of the cyclic sulfurous acid ester of pentaerythritol dichlorohydrin, 20 gm. of tris-(p-dimethylaminophenyl)-phosphine and 4 cc. of pyridine were added and the pressure in the apparatus was adjusted to 560 torr. After thermolysis had begun, the rest of the reaction mixture was added dropwise with continuous stirring in the same proportions as the amount of 3,3-bis-(chloromethyl)-oxetane distilled off. The addition was completed in 7½ hours and 1259 gm. of crude distillate were obtained which upon redistillation gave 971 gm. (78% yield) of 3,3-bis-(chloromethyl)-oxetane having a boiling point of 78–80° C. at 10 torr.

Example II

Using the apparatus and procedure of Example I, 20 gm. of dry, finely powdered sodium aluminate were added to the reaction flask and 50 cc. of a mixture of 438 gm. of the cyclic sulfurous acid ester of pentaerythritol dichlorohydrin, 5 gm. of tris-(p-dimethylaminophenyl)-phosphine and 2 cc. of pyridine were added thereto. After the reaction began, the rest of the mixture was added dropwise with stirring over 4½ hours while the vapor temperature was 160 to 186° C. A crude distillate of 288 gm. was obtained which upon redistillation gave 221 gm. (71.4% yield) of 3,3-bis-(chloromethyl)-oxetane having a boiling point of 78–80° C. at 10 torr.

Example III

A mixture of 43.8 gm. of the cyclic sulfurous acid ester of pentaerythritol dichlorohydrin, 0.5 gm. of tris-(p-dimethylaminophenyl)-phosphine and 0.2 cc. of pyridine in a 100 cc. round bottom flask equipped with a 20 cm. Vigreux column which was connected by a condensor with a receiver was heated to 275° C. in a metal bath. Over a period of about 2 hours, 16.5 gm. of raw distillate was obtained at a vapor temperature of 180 to 195° C. and at atmospheric pressure which upon redistillation gave 8.7 gm. of 3,3-bis-(chloromethyl)-oxetane having a boiling point of 80 to 95- C. at 10 torr.

Various modifications of the process of the invention may be made without departing from the spirit or scope thereof and it is to be understood that the invention is to be limited only as defined in the appended claims.

I claim:

1. A process for the preparation of 3,3-bis-(chloromethyl)-oxetane which comprises subjecting the cyclic sulfuorous acid ester of pentaerythritol dichlorohydrin to thermolysis at temperatures from 200° to 450° C. in the presence of a salt-like catalyst selected from the group consisting of organic onium compounds of elements selected from the group consisting of phosphorus, sulfur, arsenic and nitrogen and organic compounds which are converted into the said onium compounds and in the presence of an inorganic acid scavenger to form 3,3-bis-(chloromethyl)-oxetane and recovering the latter.

2. The process of claim 1 wherein the thermolysis temperature is 240° to 330° C.

3. The process of claim 1 wherein the acid scavenger is an oxide of a metal from Groups II and III of the periodic table.

4. The process of claim 1 wherein the acid scavenger is an alkaline reacting salt of an alkali metal.

5. The process of claim 1 wherein the acid scavenger is an alkali metal aluminate.

6. The process of claim 1 wherein the acid scavenger is sodium aluminate.

7. The process of claim 1 wherein the acid scavenger is present in amounts of 5 to 100 gm. per mol of the said cyclic sulfurous acid ester.

8. The process of claim 1 wherein the acid scavenger is present in amounts of 10 to 50 gm. per mol of the said cyclic sulfurous acid ester.

References Cited

UNITED STATES PATENTS 2,844,592  7/1958  Pietsch et al. _____ 260—333

FOREIGN PATENTS 1,030,352  5/1958  Germany.

OTHER REFERENCES

Houben-Weyl, Methoden der Organischen Chemie, vol. VI/3, 1965, pp. 493–5.

NORMA S. MILESTONE, Primary Examiner